United States Patent
Iverson et al.

(10) Patent No.: US 12,053,667 B2
(45) Date of Patent: Aug. 6, 2024

(54) LEAN BASED STEERING SYSTEM FOR USE WITH TILTING CYCLE

(71) Applicant: Saris Equipment, LLC, Edison, NJ (US)

(72) Inventors: Jeffery T. Iverson, Madison, WI (US); Dean A. Yeazel, Madison, WI (US); Edward M. Watson, Madison, WI (US)

(73) Assignee: Saris Equipment, LLC, Edison, NJ (US)

( * ) Notice: Subject to any disclaimer, the term of this patent is extended or adjusted under 35 U.S.C. 154(b) by 323 days.

(21) Appl. No.: 17/323,104

(22) Filed: May 18, 2021

(65) Prior Publication Data

US 2021/0362000 A1 Nov. 25, 2021

Related U.S. Application Data

(60) Provisional application No. 63/027,436, filed on May 20, 2020.

(51) Int. Cl.
*A63B 22/06* (2006.01)
*A63B 24/00* (2006.01)
(Continued)

(52) U.S. Cl.
CPC ...... *A63B 22/0605* (2013.01); *A63B 24/0087* (2013.01); *A63B 69/16* (2013.01);
(Continued)

(58) Field of Classification Search
CPC . A63B 22/0605; A63B 69/16; A63B 71/0622; A63B 2022/0641;
(Continued)

(56) References Cited

U.S. PATENT DOCUMENTS 6,471,586 B1 * 10/2002 Aiki ...................... A63F 13/803
463/6
7,326,151 B2 2/2008 Peterson et al.
(Continued)

FOREIGN PATENT DOCUMENTS

EP 3438607 A1 2/2019
JP 5876321 3/2016
(Continued)

OTHER PUBLICATIONS

EP Search Report Dated Oct. 13, 2021 from EP App. No. 21174836.3.

(Continued)

*Primary Examiner* — Megan Anderson
*Assistant Examiner* — Sara K. Conway
(74) *Attorney, Agent, or Firm* — Leason Ellis LLP

(57) ABSTRACT

An exercise equipment system with a movable support that is movable in a lateral direction, a sensor adapted to generate a lateral tilt signal, and a processor for generating a left or right turn output signal to a ride simulation in response to tilting of the exercise equipment during use. The exercise equipment may be a cycle mounted to a base. The processor may further filter out small magnitude sensor signals generated through left or right tilting that occurs during cycling, which are not indicative of a turn. The system may also include a display for visualizing a ride simulation of one or more network connected cycle avatars that are individually controlled with a lean-to-steer system.

16 Claims, 13 Drawing Sheets

(51) Int. Cl.
*A63B 69/16* (2006.01)
*A63B 71/06* (2006.01)

(52) U.S. Cl.
CPC .. *A63B 71/0622* (2013.01); *A63B 2022/0641* (2013.01); *A63B 2024/009* (2013.01); *A63B 2220/40* (2013.01)

(58) Field of Classification Search
CPC ...... A63B 2024/009; A63B 2024/0096; A63B 2071/0644; A63B 24/0087; A63F 13/245; A63F 13/428
See application file for complete search history.

(56) References Cited

U.S. PATENT DOCUMENTS

| | | |
|---|---|---|
| 7,837,595 B2 | 11/2010 | Rice |
| 8,025,607 B2 | 9/2011 | Ranky et al. |
| 8,892,219 B2 | 11/2014 | Pryor |
| 10,379,604 B2 | 8/2019 | Malafeew |
| 2002/0055422 A1 | 5/2002 | Airment et al. |
| 2008/0026838 A1 | 1/2008 | Dunstan et al. |
| 2010/0035726 A1 | 2/2010 | Fisher et al. |
| 2013/0130798 A1 | 5/2013 | Nir et al. |
| 2016/0084869 A1* | 3/2016 | Yuen ...................... A63B 60/46 73/510 |
| 2016/0291599 A1* | 10/2016 | Doerksen ............... A63C 17/12 |
| 2018/0339211 A1 | 11/2018 | Coberly et al. |
| 2019/0070476 A1 | 3/2019 | Bass et al. |
| 2019/0381351 A1* | 12/2019 | Irving .................. A63B 21/015 |
| 2021/0060380 A1* | 3/2021 | Hawkins, III ... A63B 21/00069 |
| 2021/0245012 A1* | 8/2021 | Kumar ............ A63B 21/00181 |
| 2022/0176197 A1* | 6/2022 | Pacheco Hernandez .................... A63B 69/00 |
| 2022/0219066 A1* | 7/2022 | Lee .................... G06Q 20/0658 |

FOREIGN PATENT DOCUMENTS

| | | | |
|---|---|---|---|
| KR | 101776870 | 9/2017 | |
| WO | WO-2009034309 A1 * | 3/2009 | ......... A63B 22/0605 |
| WO | 2017150928 | 9/2017 | |

OTHER PUBLICATIONS

Search Report in corresponding European Application No. 21174836.3, mailed Oct. 13, 2021.
European Examination Report Under Article 94(3) ECP in corresponding European Application No. 21174836.3, mailed Apr. 24, 2023.

* cited by examiner

LEAN BASED STEERING SYSTEM FOR USE WITH TILTING CYCLE

CROSS-REFERENCE TO RELATED APPLICATION

This application claims benefit from U.S. Provisional Application No. 63/027,436, filed May 20, 2020, the entire disclosures of which is hereby incorporated by reference

BACKGROUND AND SUMMARY

Various types of indoor exercise equipment are designed to mimic or simulate exercise activities that are typically done in an outdoor environment. For example, a stationary treadmill allows a user to walk or run indoors as opposed to outdoors. Similarly, a stationary cycle allows the user to experience cycling-type exercise indoors as opposed to outdoors. As an example of the latter, a conventional bicycle can be mounted to an indoor bicycle trainer, which allows the user to adapt a bicycle, which is typically used outdoors, for use in an indoor environment.

While actual outdoor conditions cannot be exactly replicated when exercising on exercise equipment in an indoor environment, exercise equipment can be configured to simulate outdoor conditions. For example, in the case of the treadmill, the incline of the treadmill belt can be adjusted to simulate running or walking uphill or downhill. Stationary cycles and bicycle trainers, which most commonly are positioned upright and horizontal, have been designed to include features that allow the stationary cycle or bicycle and trainer combination to tilt side-to-side and to adjust an angle of inclination either upwardly or downwardly.

Often stationary cycles and bicycle trainers that are used indoors are utilized in combination with a visual ride simulation to enhance the rider experience through visual simulation of an outdoor ride. While the cadence of the cycle may be translated into the speed of an avatar in the visual ride simulation, traditional systems lack lateral, i.e., side-to-side, movement controls. Some systems attempt to provide users with lateral steering of the avatar through limited handlebar rotation. However, such systems are generally limited to stationary cycles, and are neither well suited for use with bicycle trainers nor do they provide a steering input that replicates the natural lean-to-steer motion that occurs in outdoor cycling. Accordingly, there is need for a lean-to-steer indoor cycling system for use with a ride simulation program.

It is an object of the present invention to enable a user to more realistically experience lateral steering that natural occurs in an outdoor environment when using an item of exercise equipment in an indoor environment. It is another object of the invention to provide movement of an item of exercise equipment in the lateral plane to enhance the user's experience when using the item of exercise equipment, while simultaneously providing direction input. It is a still further object of the invention to provide a support system for an item of exercise equipment that allows movement of the item of exercise equipment in the lateral plane to enhance the user's experience, and that can filter out non-turn indicative lateral movement of the exercise equipment from movement that indicates an intentional turn by the user.

In accordance with a first aspect of the invention, a lean-to-steer system for use with ride simulation is provided. The system includes a cycle mounted to a support, wherein the cycle is configured to tilt laterally during operation of the cycle. A sensor is located on the cycle, which may be an accelerometer or gyroscopic sensor, wherein the sensor generates a first signal to indicate a tilt of the cycle during operation. A processor receives the first signal and generates a second signal indicative of a right or left turn of the cycle during operation The system may further include a ride simulation interface, such as a visual display including the simulated ride, wherein the second signal defines a directional input for use in the ride simulation interface.

The direction input provided by the system may define right or left steering of an avatar during the ride simulation interface as presented on the visual display. The ride simulation may include a single user or alternatively, multiple users connected via a network. Wherein the ride simulation interface is a network connected system including a plurality of avatars, each may be configured to receive directional input from a corresponding second signal indicative of a right or left turn of the cycle corresponding to each avatar's individual sensor equipped lateral tilting exercise device. Such devices may include a bicycle engaging a bicycle trainer and supported by at least one platform disposed on a base configured to allow lateral tilting movement of the bicycle relative to base during operation of the bicycle. The device may alternatively or additionally include an indoor cycle supported by a portion of the frame of the indoor cycle disposed on a base configured for lateral tilting movement of the indoor cycle relative to base during operation of the indoor cycle.

The processor algorithm that generates the directional input may further filter a portion of the first signal that is not generated in response to the right or left turn of the cycle during operation. The filtering applied by the processor, may include one or more of Kalman filters, moving average, temporal average, exponential treatment, numerical differentiation and/or threshold modification.

In another aspect of the invention, a method of controlling the lateral direction of an avatar in a ride simulation is provided. The method may include the steps of first providing a cycle mounted to a support, wherein the cycle is configured to tilt laterally during operation of the cycle, and wherein a sensor is affixed to the cycle. Upon laterally tiling the cycle during operation, generating a first signal at the sensor to indicate the tilt of the cycle during operation. Then, transmitting the first signal from the sensor to a processor and receiving the first signal at the processor. Then generating a second signal indicative of a right or left turn of the cycle during operation; and, transmitting the second signal to a ride simulation to provide a directional instruction to the avatar. The step of generating the second signal may further comprise applying at least one signal filter to minimize a portion of the first signal that is indicative of lateral tilt of the cycle that is not generated in response to the right or left turn of the cycle during operation. Additionally, the step of generating the second signal may also comprise generating a magnitude of directional input for the avatar displayed within the ride simulation interface.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
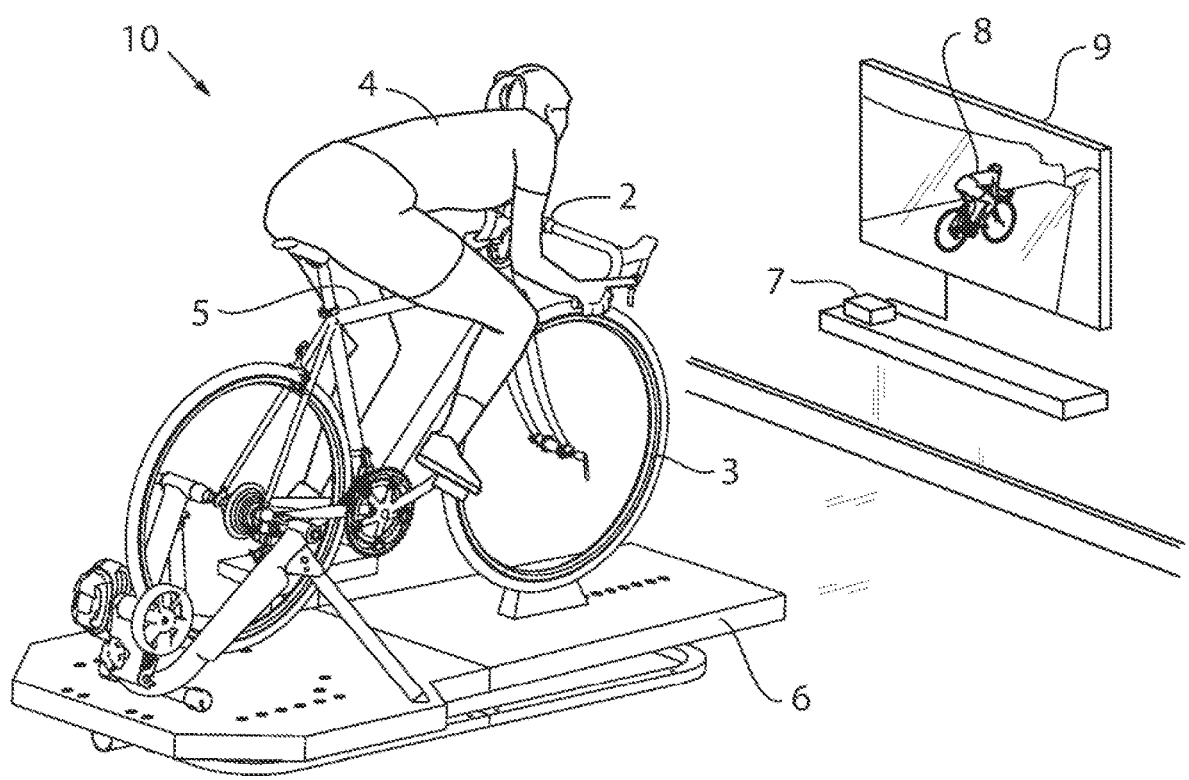
FIG. 1 is a rear isometric view of one embodiment of a lean-to-steer system in use with a movable exercise equipment support in accordance with the present invention, showing the movable exercise equipment support receiving an exercise cycle and user in an operative use configuration.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring initially to FIG. 1, a lean-to-steer exercise system is indicated generally as 10 in the figures. The lean-to-steer exercise system 10 contemplates a sensor 2 that is representatively mounted to an exercise cycle 3 such as an indoor cycle or trainer mounted bicycle that exhibits side-to-side tilting movement during use. However, in an alternative embodiment, the sensor may be attached directly to the rider 4. When the rider leans into a left or right turn, the frame 5 of the exercise equipment, which may be mounted to a movable support 6, will similarly lean or rotate to the side and the sensor will measure the corresponding movement. The initial tilt signal that is measured at the sensor 2 will be filtered through a steering signal determination algorithm to generate a consistent steering signal. The steering signal will then be transmitted to a processor 7 executing a ride simulation interface, i.e., video game, training simulator, etc., as a directional movement instruction for an avatar 8 that is displayed on a viewing screen 9. In this manner, a rider may steer the avatar through the ride simulation interface through the tilting of the exercise equipment during use as to provide an improved simulation of the feel of real-world cycling. While different components will be described below in the context of a number of different embodiments, it should be noted that any of these components could be used in combination with any components of the other embodiments in order to achieve a lean-to-steer exercise system 10 that generates a directional input, i.e., steering signal, for use in a ride simulation interface through the leaning of the user and corresponding tilting of the exercise equipment.

Figure 2:
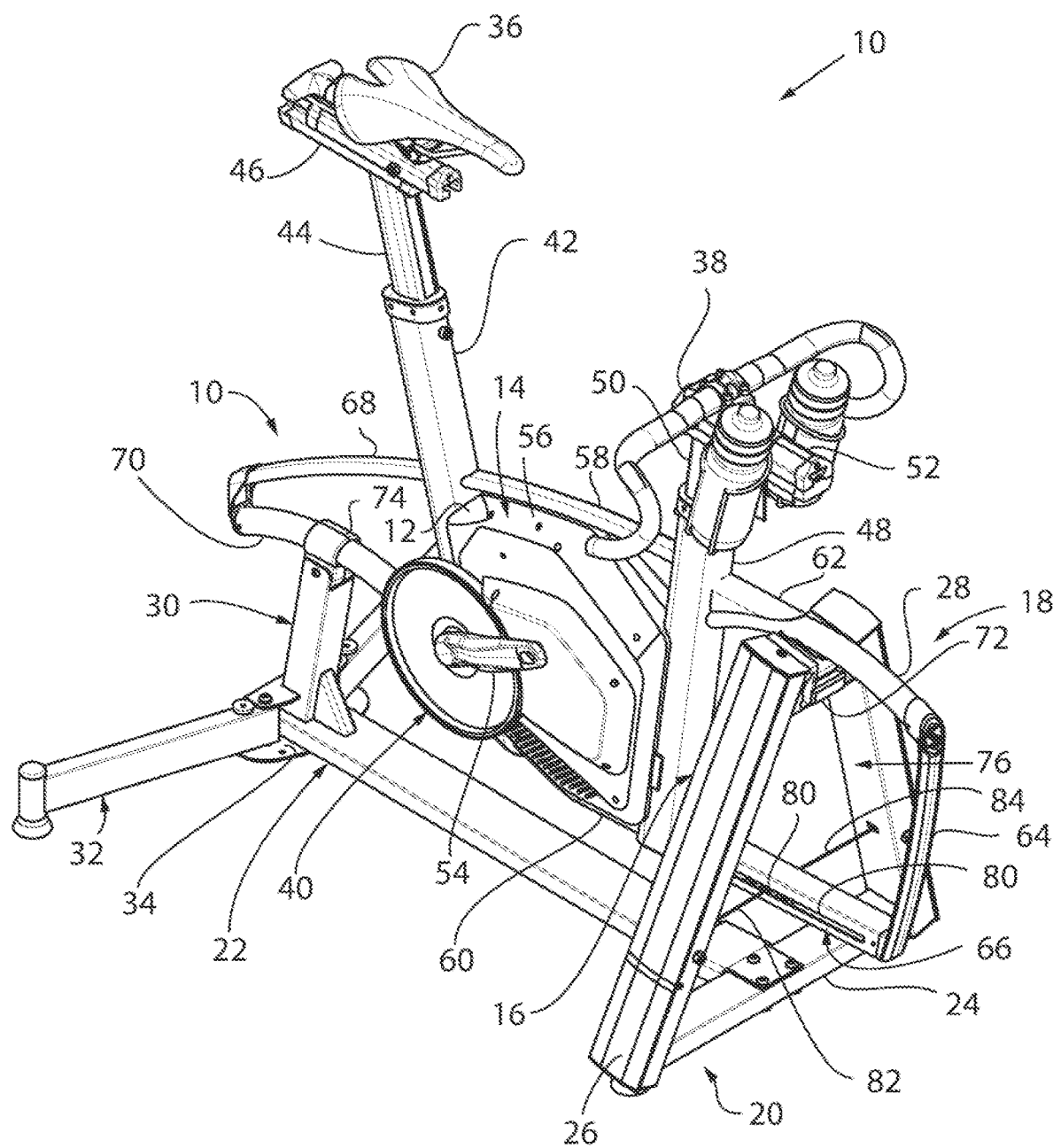
FIG. 2 is a front isometric view of one embodiment of a movable exercise equipment configured for use with the lean-to-steer system of FIG. 1.
Figure 3:
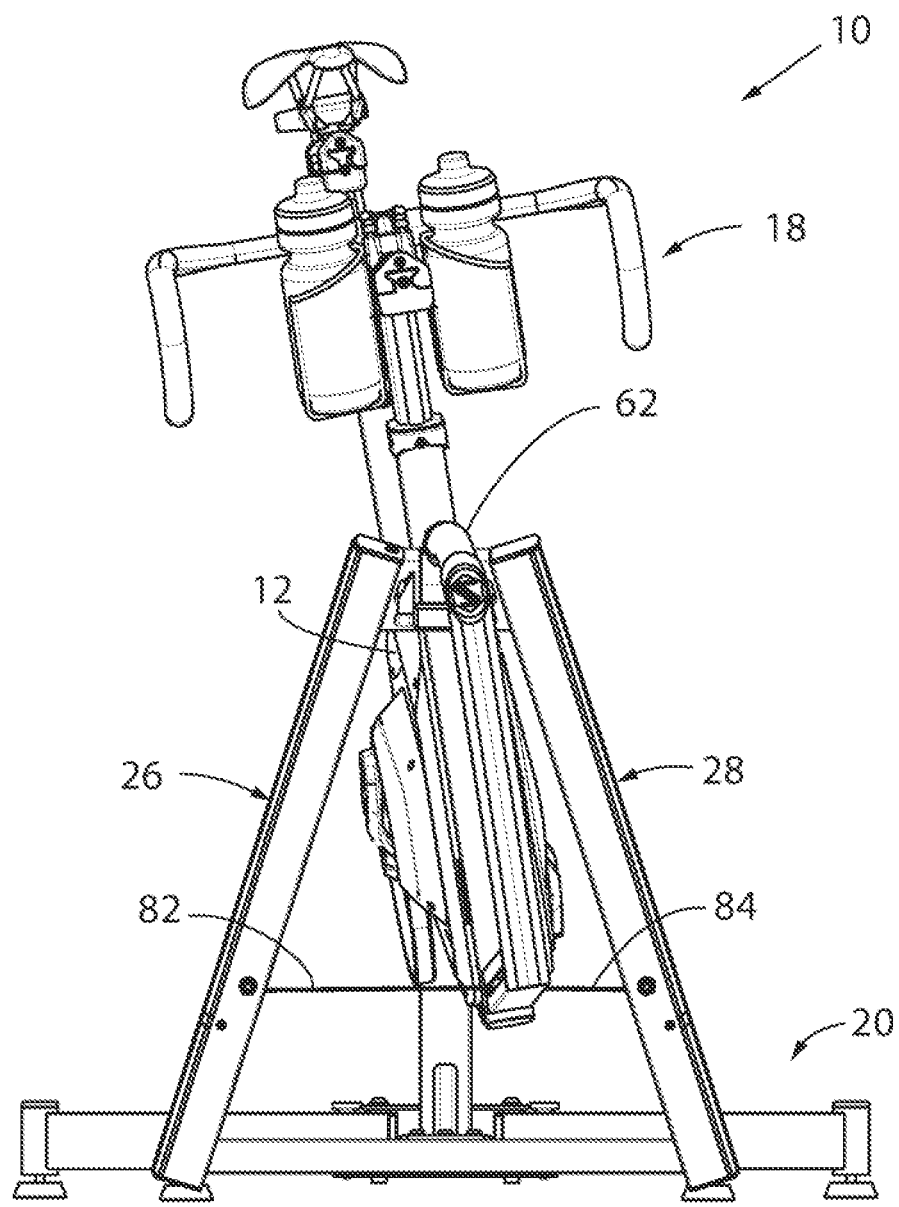
FIG. 3 is a front elevation view of the exercise equipment of FIG. 2 while executing a right lean.
Figure 4:
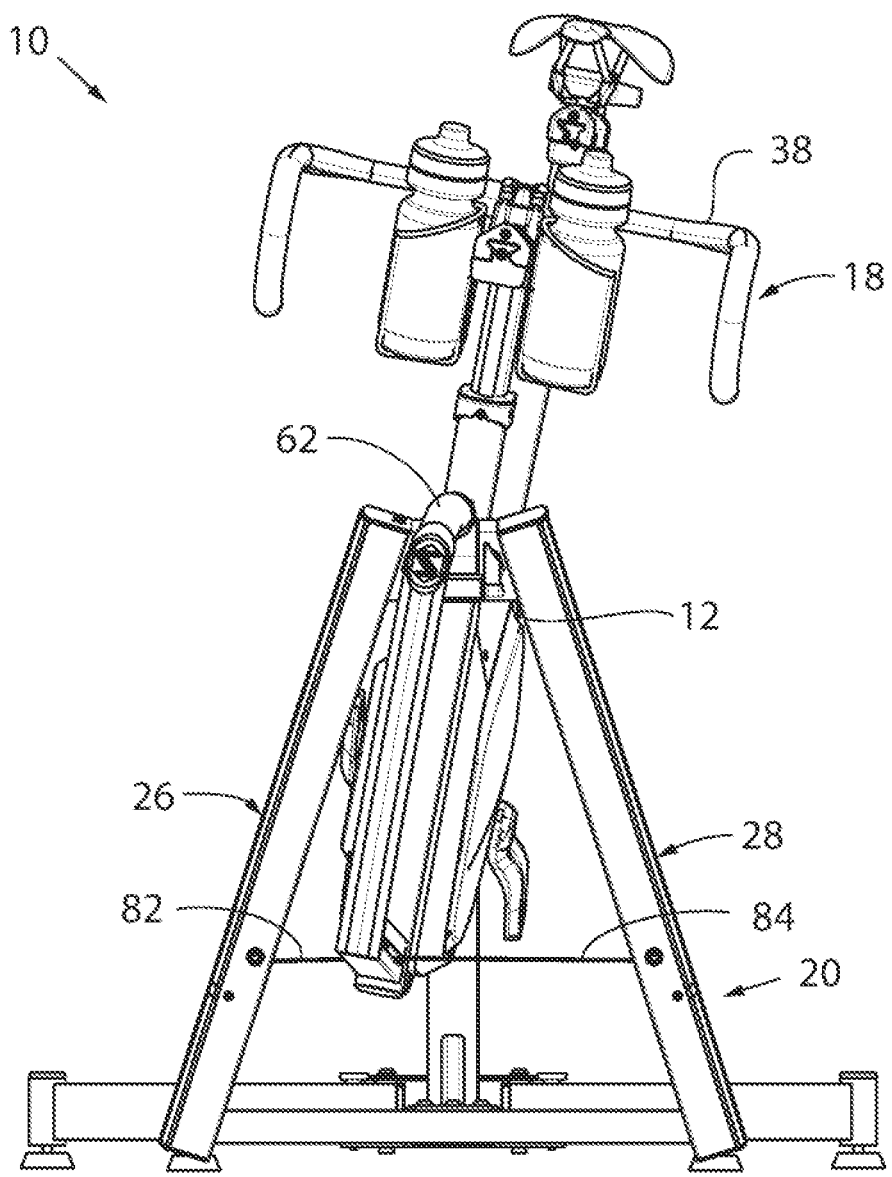
FIG. 4 is a front elevation view of the exercise equipment of FIG. 2 while executing a left lean.
Figure 5:
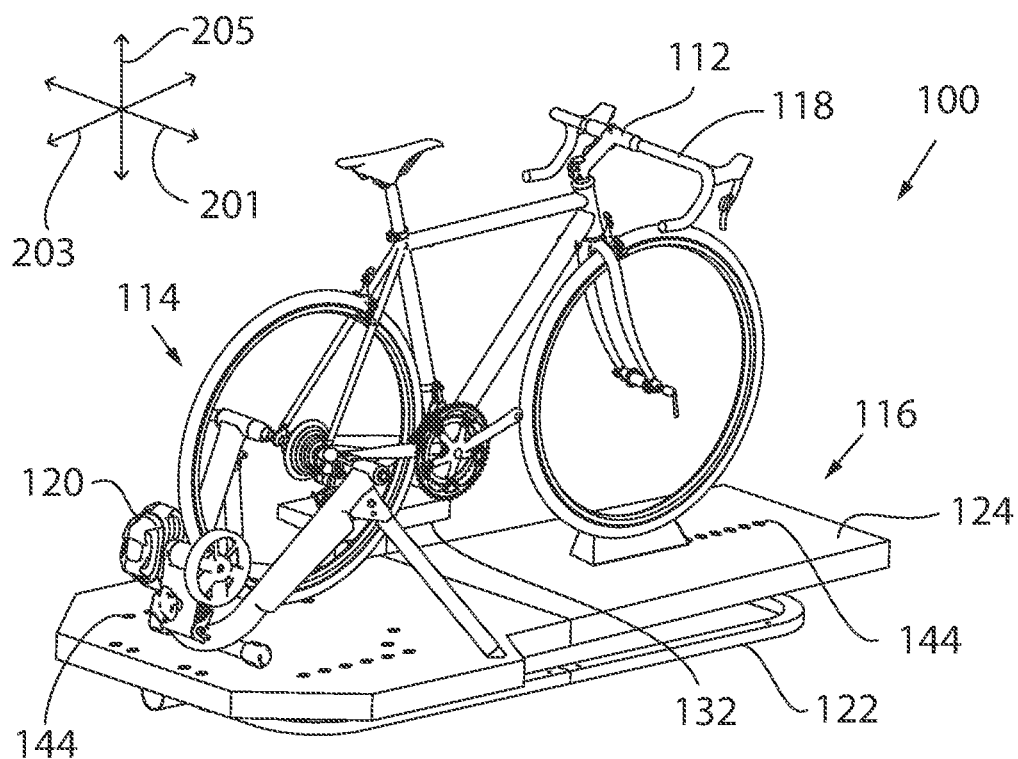
FIG. 5 is a rear isometric view of one alternative embodiment of a movable exercise equipment support receiving an exercise cycle, in accordance with the system of FIG. 1.

Specific potential embodiments will now be described in further detail. Turning now to FIGS. 2-8 and initially to FIGS. 2-4, one embodiment of the lean to steer exercise system 10 generally includes a sensor 12 or sensor array that is incorporated into an item of exercise equipment 14 that may include or alternatively be mounted to a movable support 16. In one embodiment, the movable support 16 is incorporated into the structure of the item of exercise equipment 14, which as shown in FIGS. 2-4 may include a stationary cycle-type exercise device 18 (hereafter referred to as cycle 18) in which exercise equipment 14 is movably supported on a base 20. It is understood that the item of exercise equipment incorporated into the movably supported item of exercise equipment 14 need not be limited to equipment such as a stationary cycle 18, and that any type of stationary exercise equipment to which repetitive or cyclic forces are applied by a user during operation may be employed.

In a representative embodiment, the base 20 of the movably supported item of exercise equipment 14 is adapted to be positioned on a supporting surface such as a floor, and includes a longitudinally extending central lower support member 22 and a transversely extending front support member 24, which cooperate to form a generally T-shaped lower support for the base 20. A pair of inwardly angled front stanchions 26, 28 extend upwardly from the opposite ends of the front support member 24 and cooperate to form a front support for the cycle 18. A rear stanchion 30 extends upwardly from the rear end of central lower support member 22, and forms a rear support for the cycle 18. A pair of foldable outriggers 32 are pivotably mounted to a rear bracket 34, which is secured to the rear of the base 20 at the interconnection of central lower support member 22 and rear stanchion 30. The outriggers 32 can be moved between an operative extended position as shown, in which the outriggers 32 provide lateral stability to the movably supported item of exercise equipment 14, and a retracted or inward position in which the outriggers 32 are positioned adjacent the central lower support member 22, to reduce the footprint of the item of exercise equipment 14 for shipment and storage. It is understood, however, that the structural details of the base 20 as described are illustrative of any number and configuration of support components that may be employed for providing a stable support for the cycle 18 during use.

The cycle 18, which is movably supported on the base 20, generally includes a frame assembly that mounts user support and input components. In the illustrated embodiment, the user support and input components include a saddle or seat 36, a handlebar 38, and a pedal-type input arrangement 40. The saddle 36 is supported by a seat tube 42, which forms part of the frame assembly of cycle 18. In a manner as is known, the position of the saddle 36 may be adjusted using a height adjustment member 44 that is telescopingly engaged with the seat tube 42, and a front-rear longitudinal adjustment member 46 that is secured to the upper end of height adjustment member 44, and to which saddle 36 is adjustably secured. Similarly, the handlebar 38 is supported by a head tube 48, which forms part of the frame assembly of cycle 18. In a manner as is known, the position of the handlebar 38 may be adjusted using a height adjustment member 50 that is telescopingly engaged with the head tube 48, and a front-rear longitudinal adjustment member 52 that is secured to the upper end of height adjustment member 48, and to which handlebar 38 is adjustably secured. The pedal-type input arrangement 40 includes a set of pedals (not shown) with which the user's feet are engageable, and a pair of crank arms 54 which, during operation, transmit torque to a resistance mechanism, shown generally at 56, that is mounted to the frame of cycle 18. Typically, the crank arms 54 are connected to an input ring or gear, and a drive member, such as a chain or belt, rotates a flywheel associated with the resistance mechanism in response to application of pedaling forces by the user. The resistance mechanism 56 may be any suitable type of resistance mechanism that provides adjustable resistance to pedaling forces applied by the user. Examples include, but are not limited to fluid-type, mechanical, magnetic, electrical or electromechanical resistance mechanisms, although any type of resistance mechanism may be employed.

In addition to the seat tube 42 and head tube 48, the frame of the cycle 18 further includes top and bottom frame members 58, 60, respectively, which extend between and interconnect the seat tube 42 and head tube 48. In the illustrated embodiment, the resistance mechanism 56 is secured to the frame of cycle 18 within an area defined by the seat tube 42, head tube 48 and top and bottom frame members 58, 60, respectively, although any other satisfactory configuration may be employed.

Cycle 18 further includes a front support assembly that extends forwardly from head tube 18 and a rear support assembly that extends rearwardly from seat tube 42. The front support assembly includes an arcuate upper support member 62, in combination with a front brace member 64 that extends downwardly from the forward end of upper support member 62, and a centering guide member 66 that extends between the lower end of front brace member 64 and the lower end of head tube 48. The arcuate upper support member 62 is movably supported by the upper ends of front stanchions 26, 28, as described in further detail below. As will also be explained, the centering guide member 66 assists in biasing cycle 18 toward an upright position during operation. The rear support assembly includes an arcuate lower support member 70, which is supported by the upper end of rear stanchion 30. The rear support assembly also includes an upper brace member 68, which extends between the rear end of arcuate lower support member 70 and seat tube 42.

Cycle 18 is supported on base 20 in a manner that simulates cycle riding in an outdoor environment. Specifically, cycle 18 is capable of movement relative to base 20 in a longitudinal fore-aft direction as well as movement in a tilting or side-to-side manner. A fore-aft centering arrangement and a tilt centering arrangement bias the cycle 18 toward fore-aft and tilt centered positions, respectively, relative to base 20.

More specifically, a bracket 72 is secured between the upper ends of front stanchions 26, 28. The upper support member 62 is capable of translating in a fore-aft direction relative to the bracket 72, such as by movement on a grooved roller mounted to bracket 72. In a generally similar manner, the arcuate lower support member 70 of the cycle rear support assembly is capable of translating in a fore-aft direction relative to the top of the stanchion 30, such as on a grooved roller mounted to the upper end of the stanchion 30. Furthermore, the movement of the upper support member 62 relative to the bracket 72 and the movement of the arcuate lower support member 70 relative to the top of stanchion 30, while restrained within retainer 74, allows cycle 18 to tilt in a side-to-side manner when lateral sideward forces are applied to cycle 18 during use. As will be described in further detail below, the tilting of the cycle 18 in a side-to-side manner is configured to produce a signal within the sensor array 12, which is indicative of steering the cycle 18 through rider leaning, which may be transmitted as an input signal to a ride simulation program.

Additionally, the system 18 may include a centering guide member 76, which is operable to bias cycle 18 to a tilt-centered position relative to base 20, where a centering guide member 78 may cooperate with an internally located shuttle assembly 80 affixed to a pair of biasing centering cables 82, 84 that are connected to and extend outwardly in opposite directions from the shuttle assembly 80, through the centering guide member 78 to front stanchions 26, 28 respectively. It can be appreciated, however, that various other arrangements may be employed for biasing cycle 18 to a tilt-centered position.

As indicated above, the cycle 18 of system 10 is configured to tilt in a side-to-side manner as a result of the rider 4 leaning, which may generate a signal at sensor 12, before the centering guide member 76 assists to return the biased cycle 18 to a tilt-centered position relative to the base 20. More specifically, FIG. 3 illustrates a tilting position of cycle 18 relative to base 20, wherein the rider (not shown) is leaning to steer the cycle 18 to the right, and FIG. 4 illustrates an opposite tilting position of the cycle 18 relative to base 20 wherein the rider (not shown) is tilting the cycle 18 to steer to the left.

Turning now to FIGS. 5-8, in an alternative embodiment of the present invention, a lean-to-steer exercise system 110 may generally include a sensor 112 or sensor array that is mounted to or incorporated into an item of exercise equipment 114 that may include or alternatively be mounted to a movable support 116. As opposed to the prior embodiment of the system 10, in which the movable support 16 is incorporated into the structure of the item of exercise equipment 14, namely cycle 18, the movable exercise equipment support 116 is separate from, but adapted to support, an item of exercise equipment 114. In the illustrated embodiment of FIGS. 4-7, the item of exercise equipment 114 is in the form of a bicycle 118 engaged with a bicycle trainer 120. The bicycle trainer 120 is illustrated as a generally conventional trainer that engages the rear wheel of the bicycle 116 and provides resistance when the rider applies input forces to the pedals of bicycle 116, in a manner as is known. Trainers of this type are commonly available, such as those manufactured by Saris Cycling Group, Inc. of Madison, Wisconsin. It is understood, however, that any other type of bicycle trainer, such as a direct drive trainer, may be employed. It is further understood that the item of exercise equipment supported by the movable exercise equipment support 116 need not be limited to equipment such as a bicycle 118 and trainer 120 combination, and that any type of stationary exercise equipment to which repetitive or cyclic forces are applied by a user during operation may be employed.

Figure 6:
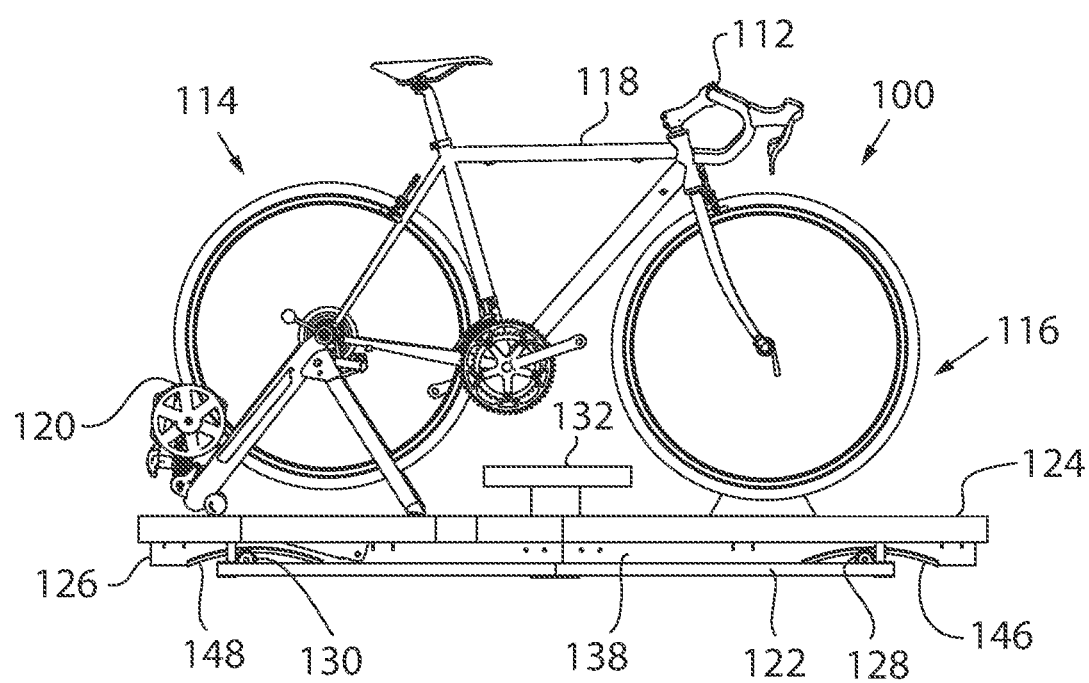
FIG. 6 is a side elevation view of the movable exercise equipment support receiving an exercise cycle of FIG. 5.
Figure 7:
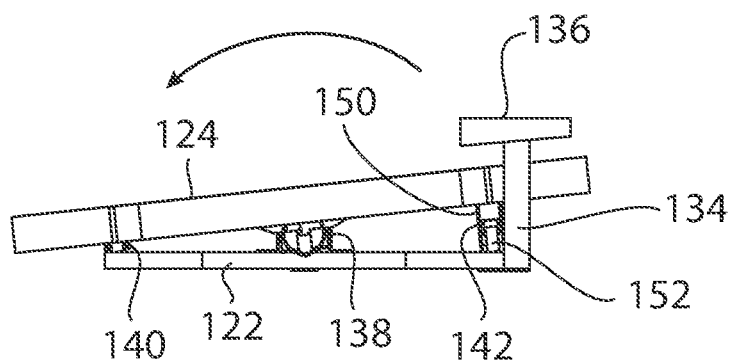
FIG. 7 is a front elevation view of the movable exercise equipment support of FIG. 5 while executing a right lean.

The movable exercise equipment support 116 generally includes a base 122 that is adapted to be positioned on a supporting surface such as a floor, a platform 124, and a frame 126. The bicycle 118 and trainer 120 are positioned on an upwardly facing surface defined by the platform 124. The platform 124 is secured to the frame 126, and the frame 126 is movably mounted to the base 122, in a manner to be explained. The frame 126 is movable relative to the base 122 in response to input forces applied by the rider or user to the pedals of bicycle 118 during use, as will also be explained. In a first direction of movement, as shown in FIGS. 6 and 7, the platform 124 and frame 126 are movable in clockwise and counterclockwise directions about a longitudinal tilt axis, which enables the bicycle 118, trainer 120 and the rider to move from side-to-side in response to input forces applied by the rider to the pedals of bicycle 118, akin to leaning right and left as described generally above in reference to FIGS. 2 and 3.

Still referring the FIGS. 4-7, the base 122 may support a first grooved roller 128 and a second grooved roller 130. A step 132 is also secured to one side of the base 122. In the illustrated embodiment, the step 132 includes an upright post 134 that is secured at its lower end to the base 122, and a generally horizontal step member 136 secured to the upper end of the post 134. The step 132 is stationarily secured to the base 122 and is adapted to support the weight of the user above the platform 124 as the user mounts and dismounts the bicycle 118.

In the illustrated embodiment, the frame 126 includes a central longitudinal frame member 138 that overlies the base 122 and that extends beyond the ends of base 122. The platform 124 may be affixed to the frame member 138, above the base 122. A pair of tilt biasing bracket assemblies 140, 142, are disposed between the base 122 and the platform 124, and outwardly of the central longitudinal frame, where in use the tilt biasing bracket assemblies 140, 142 pivot in response to the rider moving from side-to-side and tilting the bicycle 118.

The platform 124 may be have a generally flat, planar configuration, defining an upwardly facing top surface on which the bicycle 118 and trainer 120 can be positioned. If desired, the platform 124 may include a series of holes or apertures 144, which may receive fasteners, straps, etc. that can be used to secure the bicycle 118 and trainer 120 in position. The platform 124 may have any configuration as desired, and in the illustrated embodiment has a somewhat wider rear area for accommodating the trainer 120 and a narrower forward area on which the front wheel of the bicycle 118 is positioned.

The longitudinal frame member 138 is provided with first and second engagement areas 146, 148, respectively. The first and second engagement areas 146, 148 rest on and are supported by the rear and front grooved rollers 128, 130, respectively, to allow frame 126, and thereby platform 124 and bicycle 118 and trainer 120 supported thereabove, to move in an axial or fore-aft direction relative to the base 122 in response to input forces applied by the user to the pedals of bicycle 118.

Referring now to FIGS. 6 and 7, each of the tilt biasing bracket assemblies 140, 142 includes a bracket member 150, which is pivotably secured at its upper end to the underside of the platform 124. A wheel or roller 152 is rotatably mounted to the lower end of bracket member 150, and rests on the upwardly facing surface of frame 122. A biasing component (not shown), which may be in the form of a torsion spring, a compression spring, or any other satisfactory mechanism or device for exerting a downward biasing force on bracket member 160 exerts a downward biasing force that urges roller 152 against base 122. In this manner, roller 152 is biased against the upwardly facing surface of frame side member 108b, such that during use, when the rider of the bicycle leans to either the right side or the left side to simulate a turn, such that the application of forces to the pedals of bicycle 118 is unbalanced, i.e. when there is a net downward force on one side of bicycle 118 at any point in time that is experienced by platform 104, the platform 104 will tilt in the direction of the downward force by pivoting movement, such that the roller 152 is urged back, and the bracket member pivots upwardly to support the tilting platform 124. During such tilting, and as will be described in further detail below, the tilting of the bicycle 118 in a side-to-side manner is configured to produce a signal within the sensor array 112, which is indicative of steering the bicycle 118 through rider leaning, which may be transmitted as an input signal to a ride simulation program. As shown in FIGS. 1 and 4, the sensor array 12, 112, may be mounted to the bicycle 118. However, it should be understood that the present invention is not so limited and that other mounting embodiments are within the scope of the present invention. For example, the sensor 112 may be directly mounted to or integrated into the platform 124, the frame 126, or even the trainer 120. In yet another alternative embodiment, the sensor 112 may be a wearable device that is to be affixed to a rider during use of the system 100.

Figure 8:
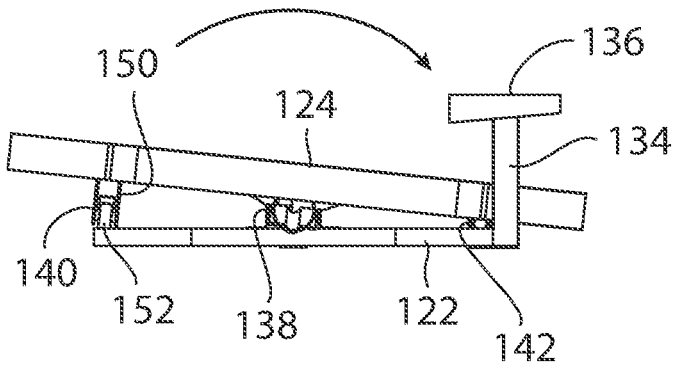
FIG. 8 is a front elevation view of the movable exercise equipment support of FIG. 5 while executing a left lean.
Figure 9:
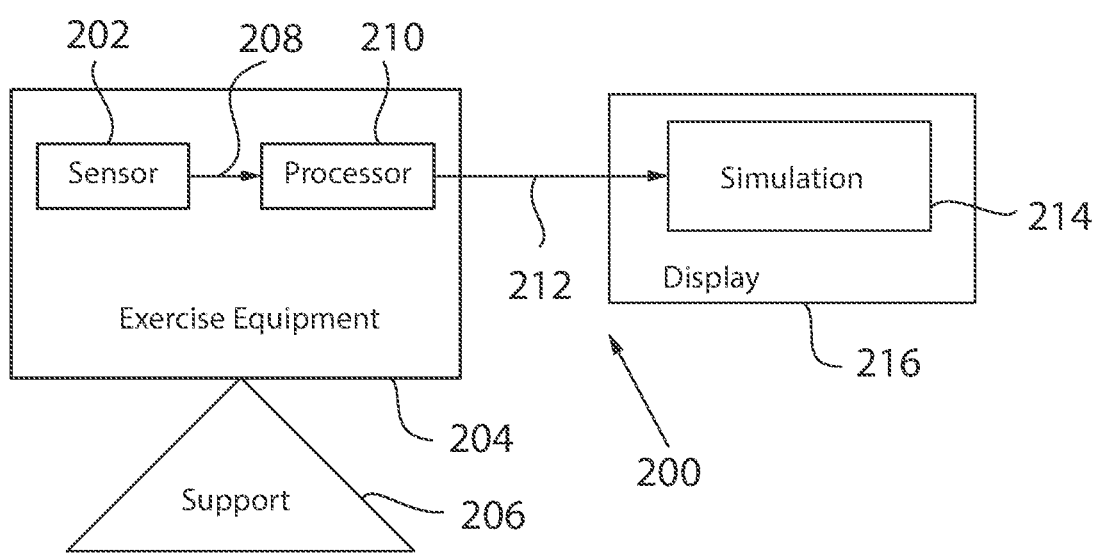
FIG. 9 is a block diagram of one embodiment of the lean-to-steer system of FIG. 1.

Turning now to FIG. 8, in a block diagram of one embodiment of the present invention, system 200 generally includes a sensor 202 or sensor array disposed on a printed circuit board (PCB) having a power supply, which is incorporated into an item of exercise equipment 204. The item of exercise equipment 204 is movable relative to a mounted support 206, as described at length above, such that the exercise equipment 204 is configured to tilt in a side-to-side manner as a result of the rider leaning, which may be indicative of a rider simulating turning the exercise equipment 204 to the right or to the left. The sensor 202 may generate a tilt signal 208 that is indicative of the tilt of the exercise equipment 204 relative to the support 206. The signal 208 is then transmitted to a processor 210, which may be located on the PCB, or alternatively remotely located relative to the exercise equipment 204. The processor 210 receives the tilt signal 208 and applies a steering algorithm to generate an output signal 212. The output signal 212 is then transmitted to an exercise simulation program 214 visible on a display 216, such as bicycle ride simulation software, where a visually displayed avatar executes a right or left steering maneuver indicative of the output signal 212 produced in response to the tilting of the exercise equipment 204 in a side-to-side manner as a result of the rider leaning.

More specifically, in one embodiment of system 200, the sensor 202 is an accelerometer, which senses the angular rotation of the exercise equipment 204, such as the cycle 16 or bicycle 116, to which the sensor 202 is either directly or indirectly mounted. The accelerometer measures the acceleration along the Y-axis 201 of the exercise equipment 204, i.e., perpendicular to both the longitudinal axis 203 and transverse axis 205 of the exercise equipment 204, as shown in FIG. 6, at a sampling rate of, for example, 100 Hz to generate a value every 10 ins. However, it should be understood that alternative sensors, such as gyroscopes or rotational encoders may be utilized to sense the tilt of the mounted sensor 202 and generate a tilt signal 208, and are well within the scope of the present invention.

Figure 10:
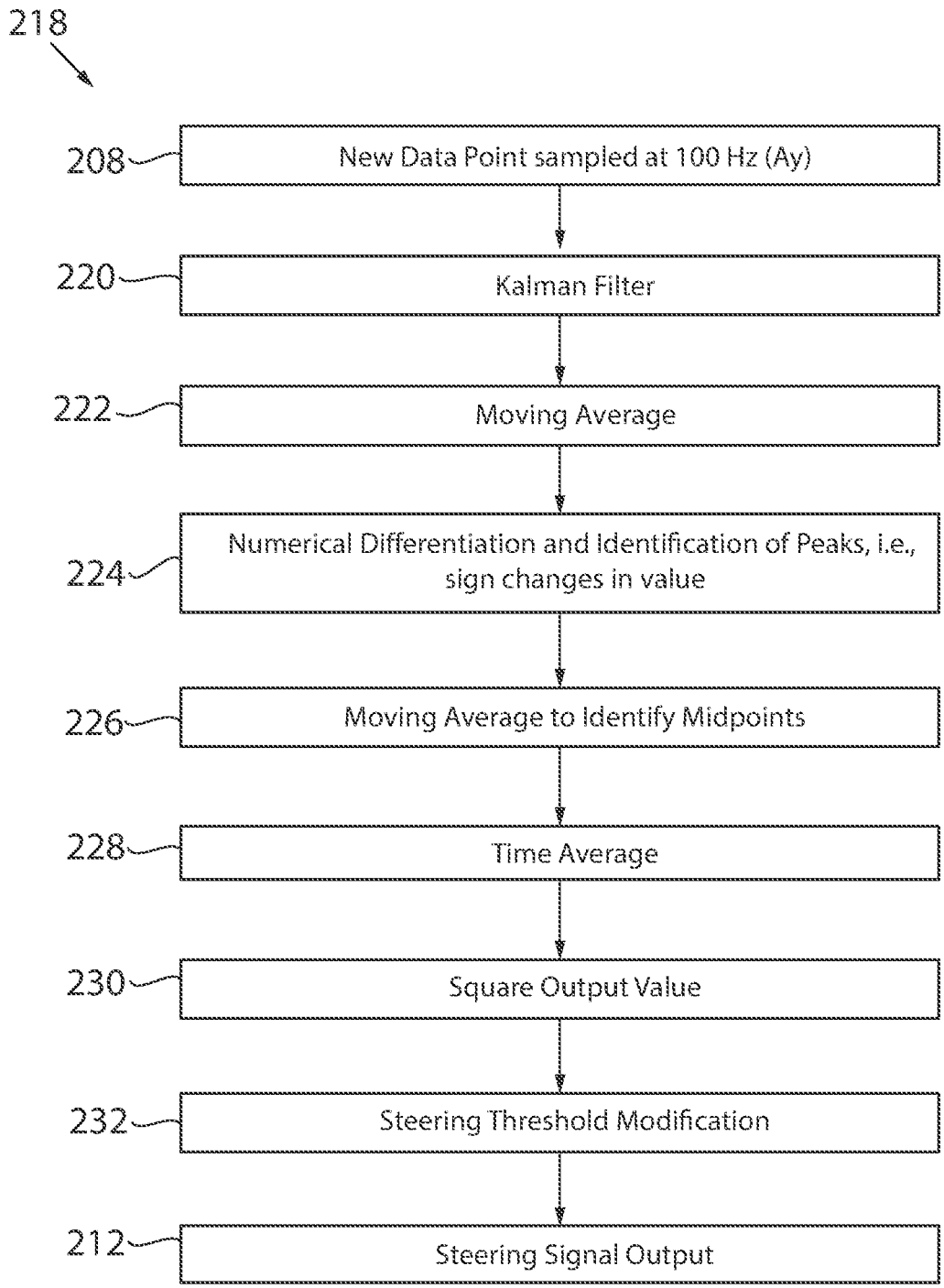
FIG. 10 is a flow chart of one embodiment of generating a steering signal in the lean-to-steer system of FIG. 1.

Turning now to FIG. 10, once generated at the sensor 202, the tilt signal 208 is applied to a steering algorithm 218 at the processor 210 to generate the output signal 212 configured to indicate a steering instruction that will be received at the exercise simulation program 214. At a first step 220 of the algorithm 218, the tilt signal 208 is subject to a Kalman filter to remove data outliers as to smooth the data of the tilt signal 208 into a curve. Generally, the Kalman filter is a recursive filter that estimates or predicts the internal state of a linear dynamic system from a series of measurements from the sensor 202 and keeps track of the estimated state of the data in the system and the variance or uncertainty of the estimate. The estimate is continually updated using a state transition model and measurement data provided by sensor 202. At subsequent step 222, a moving average of the preceding twenty (20) data points is calculated, which equates to 0.2 seconds of data points collected by sensor 202 and subject to Kalman filtering at step 220. Generation of the moving average further smooths the data set as to reduce the significant of short duration or outlying magnitude tilt signals that are not indicative of a steering signal generally. As a result of the initial collection of data points from the Kalman Filter, there is a 0.2 second delay in generating initial data at step 222, while the initial 20 data points are generated and output from step 220. At subsequent step 224 peaks are identified in the smoothed data curve provided from preceding step 222. More specifically, in step 224, numerical differentiation, through a three-point derivative, is utilized to identify the peaks in the smoothed curve as represented a sign change of the moving average data output at prior step 222, i.e., local minimums and local maximums. A sign change of the tilt data signal 208 corresponds to the change in direction of angular acceleration of the cycle 18 or bicycle 118, i.e., when the cycle 18 or bicycle 118 reaches its maximum tilt and begins to travel in an opposite direction. At subsequent step 226, the data, and specifically the two (2) prior identified peaks, is subject to a second moving average as to average the peaks and identify a midpoint between the peaks, which were each identified in the preceding step 224 through sign change. The midpoint of the peaks is indicative of the transition of the angular acceleration of the cycle 18 or bicycle 118, i.e., when the cycle 18 or bicycle 118 performs a change in angular motion indicating a change in lean direction. A time average is then applied to the data at step 228, which in one representative embodiment is an average over a duration of 0.5 seconds or 500 initial data points, which further smooths the midpoint data. At step 230, the data output from step 228 for each sampling is squared, which is to say multiplied by itself, thereby proportionately amplifying the output, while simultaneously rendering all outputs from step 230 positive. Although it should be understood that an alternative exponent may similarly be applied to the value at step 230. At subsequent step 232, the data output from step 228 is subject to a steering threshold calculation, which is to say in one nonlimiting embodiment of the invention is multiplying the data output from step 230 by a multiplier of approximately 0.545, then raising the resultant base to the exponent of approximately 1.3 and reapplying the sign of the output values from the output of step 226 to generate a steering signal 212. However, it is considered well within the scope of the present invention that the exponent of step 232 may be greater or less than 1.0, where a lower value provides increased response speed near the center and a larger value provides increased response speed near the extremes. Finally, the steering signal 212 generated by the algorithm 218 at the processor 210 may be transmitted to a system, such as a computer providing a display 216 that is operating an exercise simulation program 214. The steering signal 212, which is generated in response to the lean of the exercise equipment 204 may be received as an input into the program 214, where an avatar or alternative visual representation exhibits a movement in response to the steering signal 212 and corresponding to movement of the rider. In one representative embodiment of the present invention the exercise equipment 204 is a cycle 18 or bicycle 118, as described above, which are configured to exhibit right and left tilt in response to the lean of the rider simulating a steering turn. The steering signal 212 generated in response to such a right or left tilt is received as an input at the program 214, which in one representative embodiment may be a virtual ride simulation software, such as Zwift® or Rouvy™, where the steering signal 212 generates a corresponding right or left steering turn in an avatar displayed on the display 216 running the virtual ride simulation software program 214, in response to the rider effecting a similar turn via tilting of the cycle 18 or bicycle 118.

Figure 11:
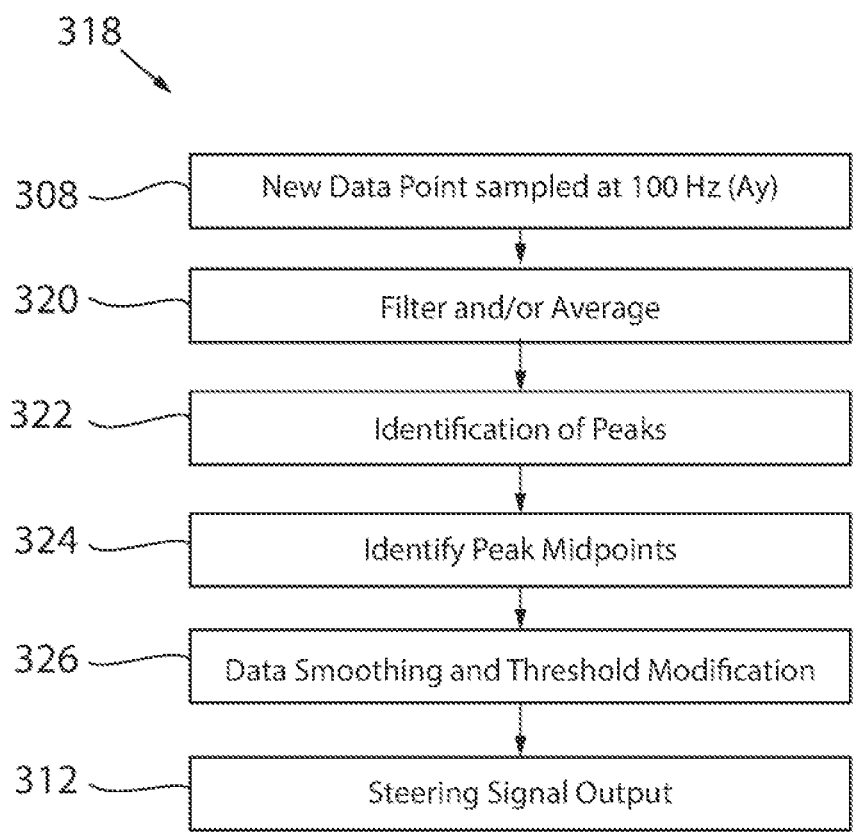
FIG. 11 is a flow chart of one alternative embodiment of generating a steering signal in the lean-to-steer system of FIG. 1.
Figure 12:
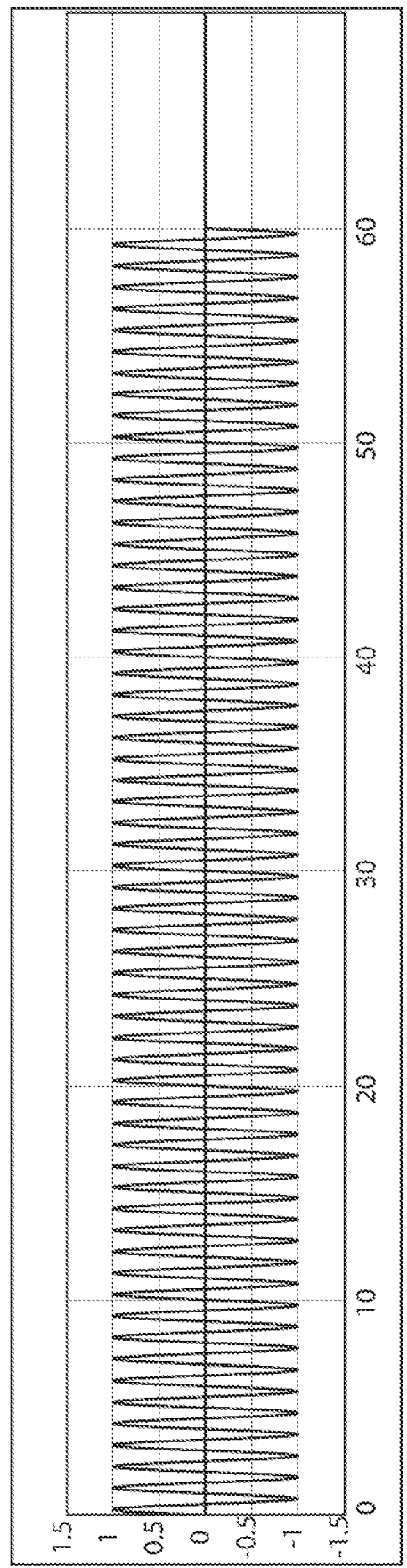
FIG. 12 is a chart identifying standard accelerometer data input generated from pedaling a cycle of the system of FIG. 1 without a user leaning to steer.
Figure 13:
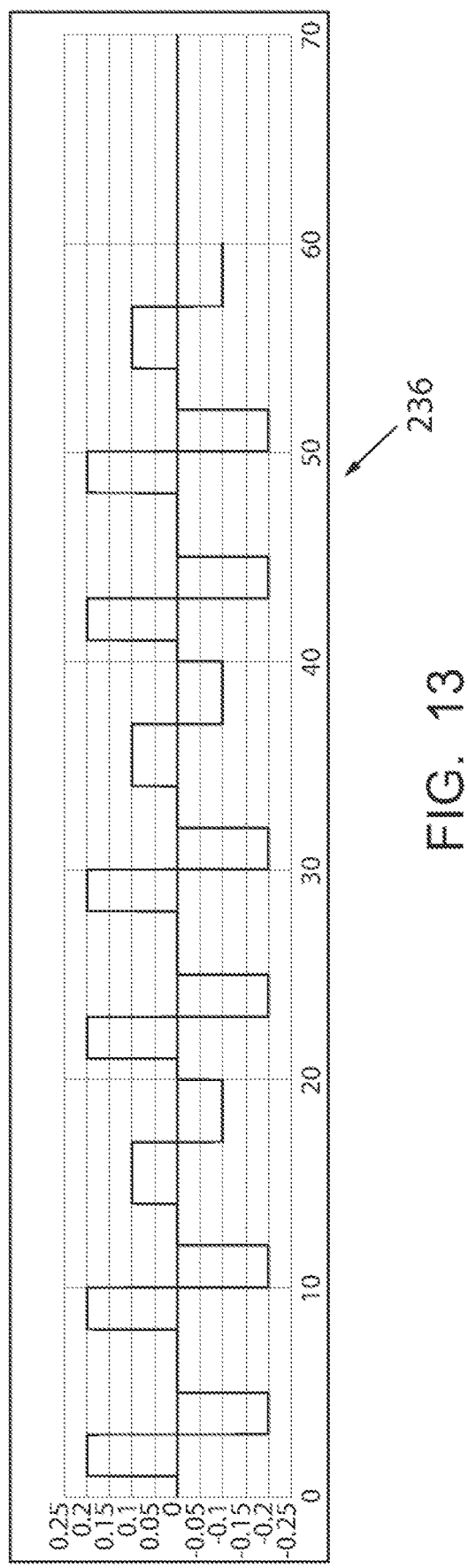
FIG. 13 is a chart identifying standard accelerometer data input generated only from leaning to steer a cycle of the system of FIG. 1 independent of a user's side-to-side pedal related accelerometer data as was shown in FIG. 12.
Figure 14:
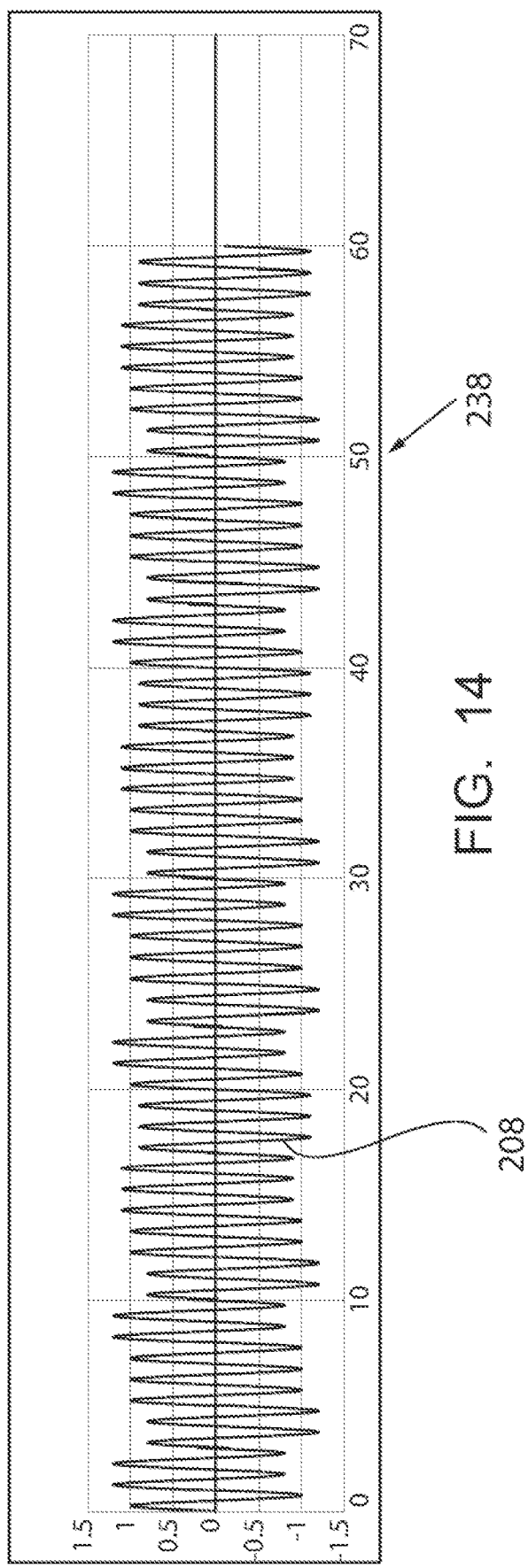
FIG. 14 is a chart identifying a combination of standard accelerometer data input generated from pedaling a cycle, shown in FIG. 12, and intermittent leaning to steer a cycle of the system, as shown in FIG. 13.
Figure 15:
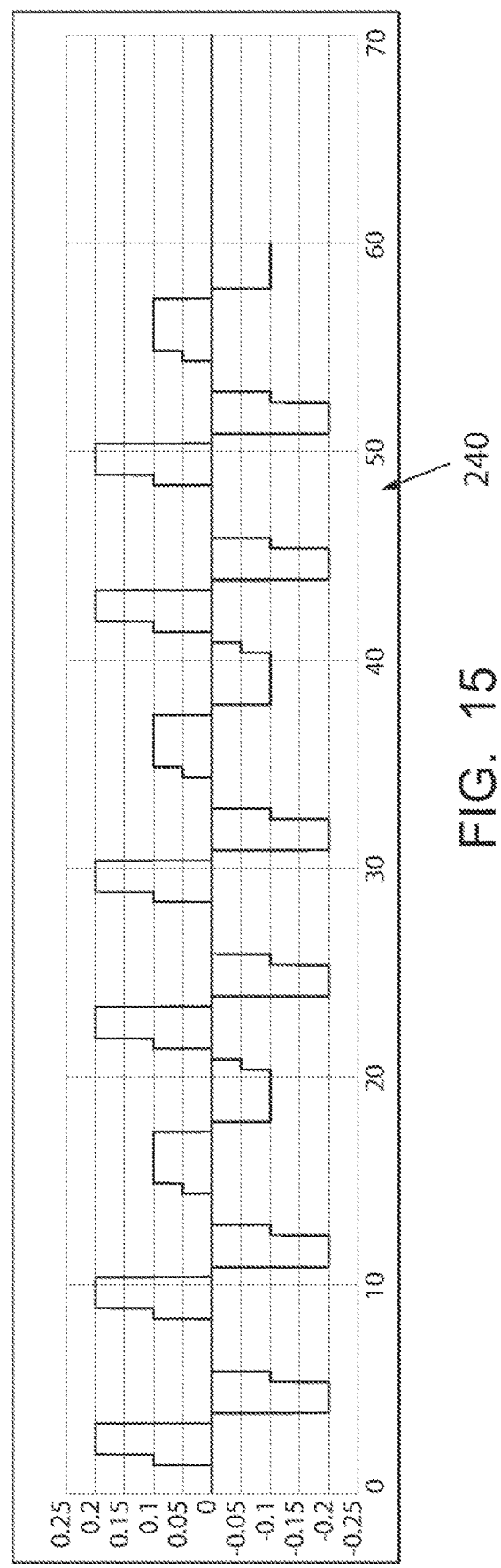
FIG. 15 is a chart showing midpoint signal peaks over time identified through the processing of accelerometer data from FIG. 14, with the system of FIG. 1; and, FIG. 16 is a chart identifying a lean-to-steer signal output over time of one embodiment the system of FIG. 1, based on the raw accelerometer data of FIG. 14.
Figure 16:
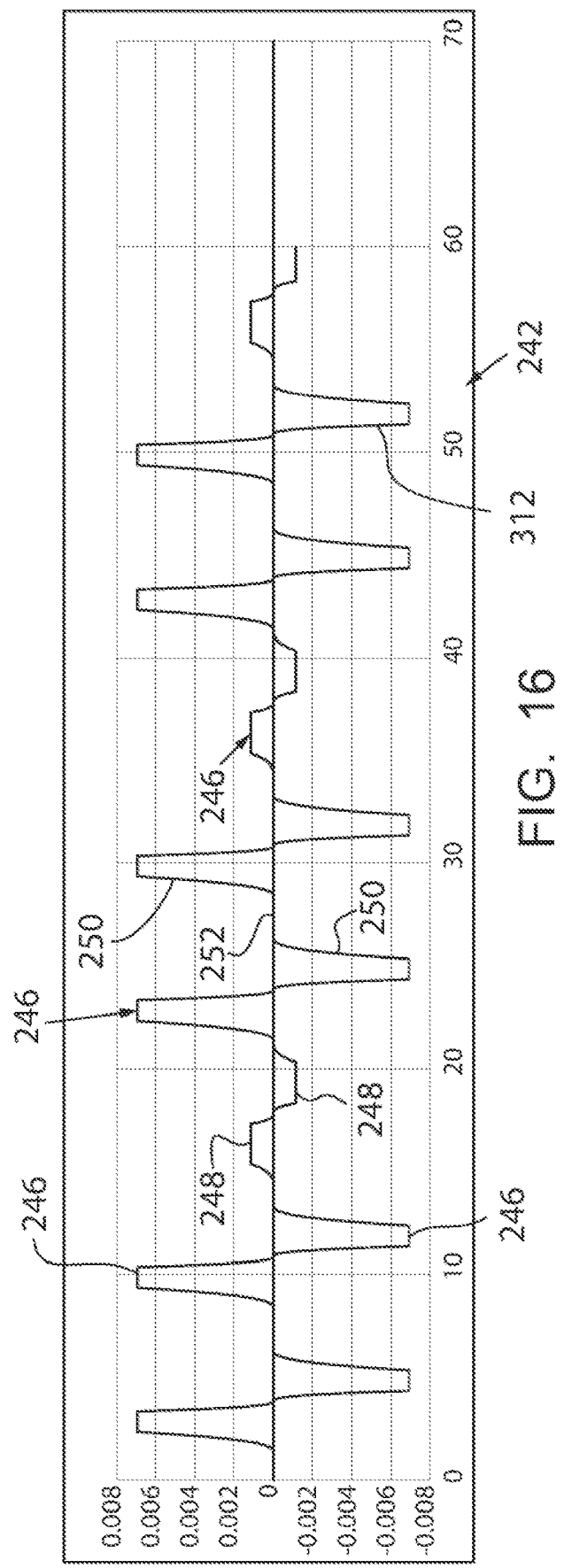

By way of another representative example, turning now to FIG. 11-16, an alternative embodiment of the steering algorithm 318 to generate the output signal 312 configured to indicate a steering instruction that will be received at the exercise simulation program 214 is shown in the flow chart of FIG. 11, and corresponding charts at FIGS. 12-16. At the initial step 308, new acceleration data points are collected from the accelerometer sensors 12, 112. Graphically, for representative purposes, the chart 234 at FIG. 12 illustrates components of the tilt signal 308 that are provided as a result of the user's naturally occurring slight right/left rocking motion on the cycle 18 when traveling straight, i.e., without applying a leaning turn. That is to say that the pedaling of the cycle 18 generates a rhythmic right/left lean of the cycle 18 when the user is generally traveling in a straight path. Additionally, for representative purposes, the chart 236 at FIG. 13 illustrates components of the tilt signal 308 that are provided as a result of the users turning right or left, i.e., leaning on the cycle 18 to apply a leaning turn. When combined, as shown in chart 238, the tilt signal 308 collected by the accelerometer 12, 112 will include data that is a combination of both the users natural cadence of right/left lean on the cycle 18 without applying a leaning turn (from FIG. 12) overlayed or combined with the intentional leaning on the cycle 18 to apply a leaning turn (From FIG. 13). At step 320 the tilt signal 308 is subject to a filter, such as but not limited to a Kalman filter to remove data outliers, smooth the data and/or a moving average to further smooth the data set as to reduce the significance of short duration or outlying magnitude tilt signals 308 that are not indicative of a steering signal generally. At subsequent step 322 peaks are identified in the smoothed data curve provided from preceding step 320, and more specifically, for example through a numerical differentiation. At subsequent step 324, the data, and specifically the two (2) prior identified peaks, are subject to an average, such as a moving average, as to identify a midpoint between the peaks. The midpoint of the peaks is indicative of the transition of the angular acceleration of the cycle 18 or bicycle 118, i.e., when the cycle 18 or bicycle 118 performs a change in angular motion indicating a change in lean direction, as shown in chart 240 of FIG. 15. The data output from step 234 for each sampling is then modified through one or more of averaging, exponential applications, and/or application of a steering threshold calculation generally, to generate a steering signal 312 as shown in chart 242 of FIG. 16. The steering signal 312 may then be transmitted to a system, such as a computer providing a display 216 that is operating an exercise simulation program 214. Accordingly, and as by way of confirmation, the steering signal 312 as shown in FIG. 16 generally correlates with the lean-to-turn isolated input data provided at chart 236 in FIG. 13, while also having generally removed non-lean-to-steer accelerometer data 308 as was shown isolated in chart 234 of FIG. 13. The output steering signal 312 further provides even peaks 244 at the maximum and minimum lean positions; turns of various magnitudes, i.e., large turns 246 and small turns 248; and, smooth transitions 250 from non-turn portions 252 to turns 246, 248.

It should be appreciated that the steering signal 212, 312 generated by the lean-to-steer system 200 described above may be provided in addition to other input signals received by the ride simulation software program 214, as are generally known.

It should also be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A lean-to-steer system for use with a ride simulation comprising:
    a cycle mounted to a support, wherein the cycle is configured to tilt laterally during operation of the cycle:
    a sensor disposed on the cycle, wherein the sensor generates a first signal to indicate a tilt of the cycle during operation, wherein the first signal comprises data representing i) a right-left rocking motion of the cycle when the cycle is traveling straight and ii) intentional tilting of the cycle representing a right or left turn of the cycle;
    a processor receiving the first signal, wherein the processor uses the first signal to generate a second signal indicative of a right or left turn of the cycle during operation, and wherein the processor provides an algorithm to generate the second signal indicative of the right or left turn of the cycle during operation and wherein the algorithm further comprises at least one moving average filter, and wherein the algorithm filters out a portion of the first signal that is not generated in response to the right or left turn of the cycle during operation, including the data representing the right-left rocking motion of the cycle when the cycle is traveling straight, and reduces the significance of short duration or outlying magnitude tilt data present in the first signal that are not indicative of the right or left turn of the cycle; and
    a ride simulation interface, wherein the second signal defines a directional input for use in the ride simulation interface.

2. The system of claim 1, wherein the directional input provides right or left steering of an avatar in the ride simulation interface as presented on a display.

3. The system of claim 1, wherein the algorithm comprises a Kalman filter.

4. The system of claim 1, wherein the sensor comprises at least one accelerometer.

5. The system of claim 1, wherein the sensor comprises at least one gyroscope.

6. The system of claim 1, wherein the cycle is a bicycle engaging a bicycle trainer and the support is at least one platform disposed on a base configured to allow lateral tilting movement of the bicycle relative to the base during operation of the bicycle.

7. The system of claim 1, wherein the cycle is an indoor cycle and the support is a portion of a frame of the indoor cycle disposed on a base configured to allow lateral tilting movement of the indoor cycle relative to the base during operation of the indoor cycle.

8. The system of claim 1, wherein the cycle is an indoor cycle and the sensor is configured to be affixable to a rider during operation of the indoor cycle.

9. A lean-to-steer system for use with a ride simulation comprising:
    a cycle mounted to a support, wherein the cycle is configured to tilt laterally during operation of the cycle;
    an accelerometer sensor disposed on the cycle, wherein the accelerometer sensor generates a first signal to indicate a lateral tilt of the cycle during operation, wherein the first signal comprises data representing i) a right-left rocking motion of the cycle when the cycle is traveling straight and ii) intentional tilting of the cycle representing a right or left turn of the cycle;
    a processor providing an algorithm configured to receive the first signal and generate a second signal using the first signal, wherein the second signal is indicative of a right or left turn of the cycle during operation in response to the lateral tilt of the cycle, wherein the algorithm filters out a portion of the first signal that is indicative of lateral tilt of the cycle that is not generated in response to the right or left turn of the cycle during operation, which includes data representing the right-left rocking motion of the cycle when the cycle is traveling straight, and reduces the significance of short duration or outlying magnitude tilt data present in the first signal that are not indicative of the right or left turn of the cycle; and
    a ride simulation interface receiving the second signal to provide a directional input for an avatar displayed within the ride simulation interface.

10. The system of claim 9, wherein the second signal indicates a magnitude of directional input for the avatar displayed within the ride simulation interface.

11. The system of claim 9, wherein the system includes a plurality of the cycles and the ride simulation interface is a network connected system including a plurality of the avatars each configured to receive directional input from a corresponding second signal indicative of a right or left turn of the respective cycle corresponding to each avatar.

12. The system of claim 11, wherein one or more of the cycles corresponding to each avatar in the ride simulation interface is a bicycle engaging a bicycle trainer and the support is at least one platform disposed on a base configured to allow lateral tilting movement of the bicycle relative to the base during operation of the bicycle.

13. The system of claim 11, wherein one or more of the cycles corresponding to each avatar in the ride simulation interface is an indoor cycle and the support is a portion of a frame of the indoor cycle disposed on a base configured for lateral tilting movement of the indoor cycle relative to the base during operation of the indoor cycle.

14. A method of controlling the lateral direction of an avatar in a ride simulation, the method comprising the steps of:
providing a cycle mounted to a support, wherein the cycle is configured to tilt laterally during operation of the cycle, and wherein a sensor is affixed to the cycle;
laterally tilting the cycle during operation;
generating a first signal at the sensor to indicate the tilt of the cycle during operation, wherein the first signal comprises data representing i) a right-left rocking motion of the cycle when the cycle is traveling straight and ii) intentional tilting of the cycle representing a right or left turn of the cycle;
transmitting the first signal from the sensor to a processor;
receiving the first signal at the processor and generating a second signal using the first signal, wherein the second signal indicative of a right or left turn of the cycle during operation, and wherein the second signal is generated by filtering out a portion of the first signal that is not generated in response to the right or left turn of the cycle during operation, including the data representing the right-left rocking motion of the cycle when the cycle is traveling straight, and reducing the significance of short duration or outlying magnitude tilt data present in the first signal that are not indicative of the right or left turn of the cycle; and,
transmitting the second signal to a ride simulation to provide a directional instruction to the avatar.

15. The method of claim 14, wherein the step of generating the second signal further comprises applying at least one signal filter to minimize a portion of the first signal that is indicative of lateral tilt of the cycle that is not generated in response to the right or left turn of the cycle during operation.

16. The method of claim 14, wherein the step of generating the second signal further comprises generating a magnitude of directional input for the avatar displayed within the ride simulation interface.

* * * * *